Sept. 8, 1942.  P. SCHENK  2,295,056
FENCE
Filed May 20, 1941

INVENTOR
Pieter Schenk
BY Harry Radzinski
ATTORNEY

Patented Sept. 8, 1942

2,295,056

UNITED STATES PATENT OFFICE 2,295,056

FENCE

Pieter Schenk, Brooklyn, N. Y.

Application May 20, 1941, Serial No. 394,271

2 Claims. (Cl. 256—22)

This invention relates to fences, fence tops or similar structures, and has for its primary object the provision of a simple, sturdy, structure so arranged as to provide an effective barrier for cats or other small animals.

In the conventional designs of fences, fence tops and similar enclosures, portions of the fence are usually so disposed that the same afford a foot-hold to cats or other animals so that in spite of the fact that the fence is intended to prevent the passage of the animals, it is relatively easy for them to surmount the same. This is particularly true where parts of the structure are arranged either horizontally or at a flat angle, and is also true where barbed wire and other protective means are employed, such means being found ineffective in preventing the passage of cats over them.

The primary object therefore, of the present invention is to provide a barrier having no parts disposed at an angle of more than thirty degrees from vertical, so that it is impossible for animals to gain foot-hold to climb over the same. I have found that a fence or barrier, arranged as above specified, can be of artistic appearance, sturdy and strong and protect the property enclosed.

Figures 1, 2:
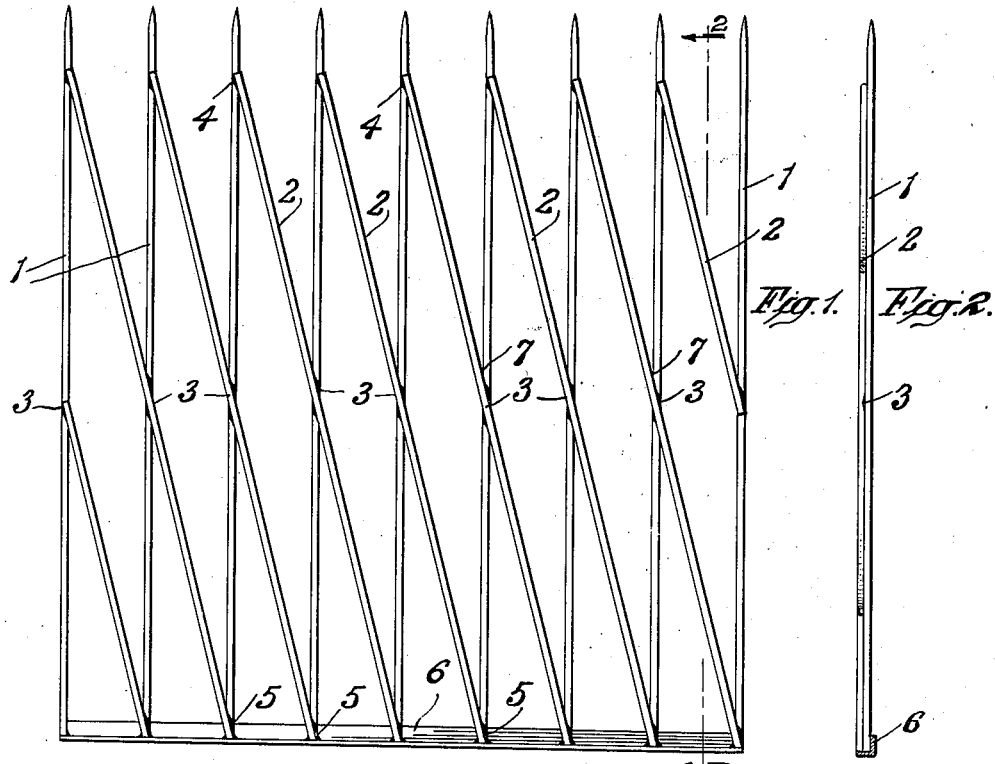
Figure 3:
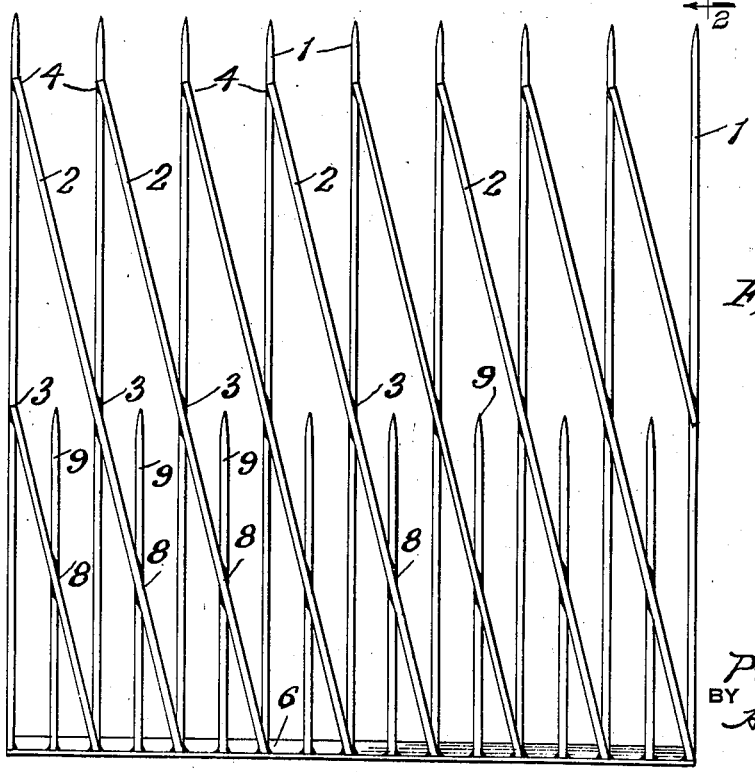

In the accompanying drawing forming a part hereof, Fig. 1 is a front view of a section of fence, fencing or fence top constructed in accordance with the invention; Fig. 2 is a sectional view on the line 2—2 of Fig. 1, looking in the direction of the arrows; and Fig. 3 is a face view of a modified structure.

With reference to the structure shown in Figs. 1 and 2, 1 indicates the vertically disposed members or pickets, the same being spaced apart for a distance insufficient to permit the passage of cats or other animals between them. These elements may be made of any suitable material, such as metal bars, round rods or the like, or of any materials which cannot be readily gripped by the claws of animals. The pickets are connected by the spaced, diagonally-extending brace members 2, the same being permanently attached to the pickets at the points 3, 4 and 5 as by welding, bolting, riveting or by any other fastening means generally utilized in fence construction. At their lower ends, the pickets and the diagonal braces 2 may be attached to a suitable base member 6 composed of angle iron or a rigidifying member of other suitable shape. It is of importance however, that such a base member as shown at 6, if one be used, be located at considerable distance from the top of the pickets 1, or, if the fence is used merely as a barrier extending along the top of a wall or other type of fence, the member 6 should be located far enough from the top of the pickets to prevent it from being used as a base from which an animal may jump or stretch over the top of the pickets. In other words, it is desirable and necessary that all members employed in the fence be disposed at a relatively sharp angle to one another, and no more than thirty degrees from vertical. I have found that in the construction of a fence of this character, wherein the diagonal members 2 are disposed at a very sharp angle, and preferably between twenty and thirty degrees from vertical, an animal cannot gain a foothold to climb over the fence. Any attempt to grasp the sharply diagonal braces results in the paws of the animal sliding downward and being pinched or squeezed at the junction 7 of the diagonal brace member and the vertical picket, which at once causes the animal to withdraw and refrain from further efforts to surmount the fence.

It will be noted that the brace members 2 overlie the pickets 1, or in other words, are not in the same plane as the pickets. Therefore, when an animal inserts its paw in the angle defined by one of the pickets and one of the braces, a twisting action is at once imparted to the paw so that the animal is frightened and at once withdraws its paw and discontinues its effort to climb over the fence.

While in the structure shown in Figs. 1 and 2 I have disclosed the vertical members or pickets 1 as being perpendicularly disposed, it will be obvious however, that these elements may also extend diagonally with respect to the vertical. As previously pointed out however, it is of importance that all elements utilized in the fence, for a distance from the top of the fence to the base 6 or for a distance greater than an animal can hurdle, shall be at an angle of no more than thirty degrees from vertical. Therefore, if the pickets 1 are angularly disposed instead of being perpendicular, as shown in Fig. 1, the angularity of said pickets must be no greater than thirty degrees as above pointed out.

It will be obvious also that various changes in design may be employed in the construction of the fence. For example, in Fig. 3 short pickets 9 are interposed between the longer pickets 1, the shorter pickets being secured to the base member 6 as indicated at 5 and also to the diagonal brace members at the point 8. This arrangement not only provides a fence of attractive appearance, but decreases the possibility of small animals squeezing through at the lower portion of the fence.

The fence may be employed for various purposes, its design and construction being largely dependent upon the uses for which it is intended. In addition to being used as a fence or fence top, it can also be employed as a gate or any other type of barrier or enclosure.

What I claim is:

1. A fence or barrier for preventing the passage of animals comprising, a plurality of spaced vertically disposed pickets disposed in the same plane, brace members secured to and extending diagonally across the pickets in a different plane from that of the pickets whereby the paw of an animal when inserted between a picket and a brace member will be given a twisting action, said brace members being disposed at an angle to the pickets of no more than thirty degrees, the upper portions of the pickets being connected solely by the diagonally extending brace members and being secured thereto only at the points where the brace members overlie the pickets whereby the provision of any horizontally disposed connection extending between the pickets and affording foot-hold for an animal is avoided.

2. A fence or similar barrier composed of at least two sets of pickets, one set of pickets extending across and being attached to the other set, one set of pickets overlying the other set and thereby being disposed in a different plane whereby the paw of an animal when inserted between one of the pickets of one set and one of the pickets of the other set will be given a twisting action, none of the pickets being disposed at an angle of more than thirty degrees from vertical, the pickets in one set being secured to those in the other set only at the points of crossing and wholly without the employment of horizontal connection except at the bases of the pickets.

PIETER SCHENK.